UNITED STATES PATENT OFFICE.

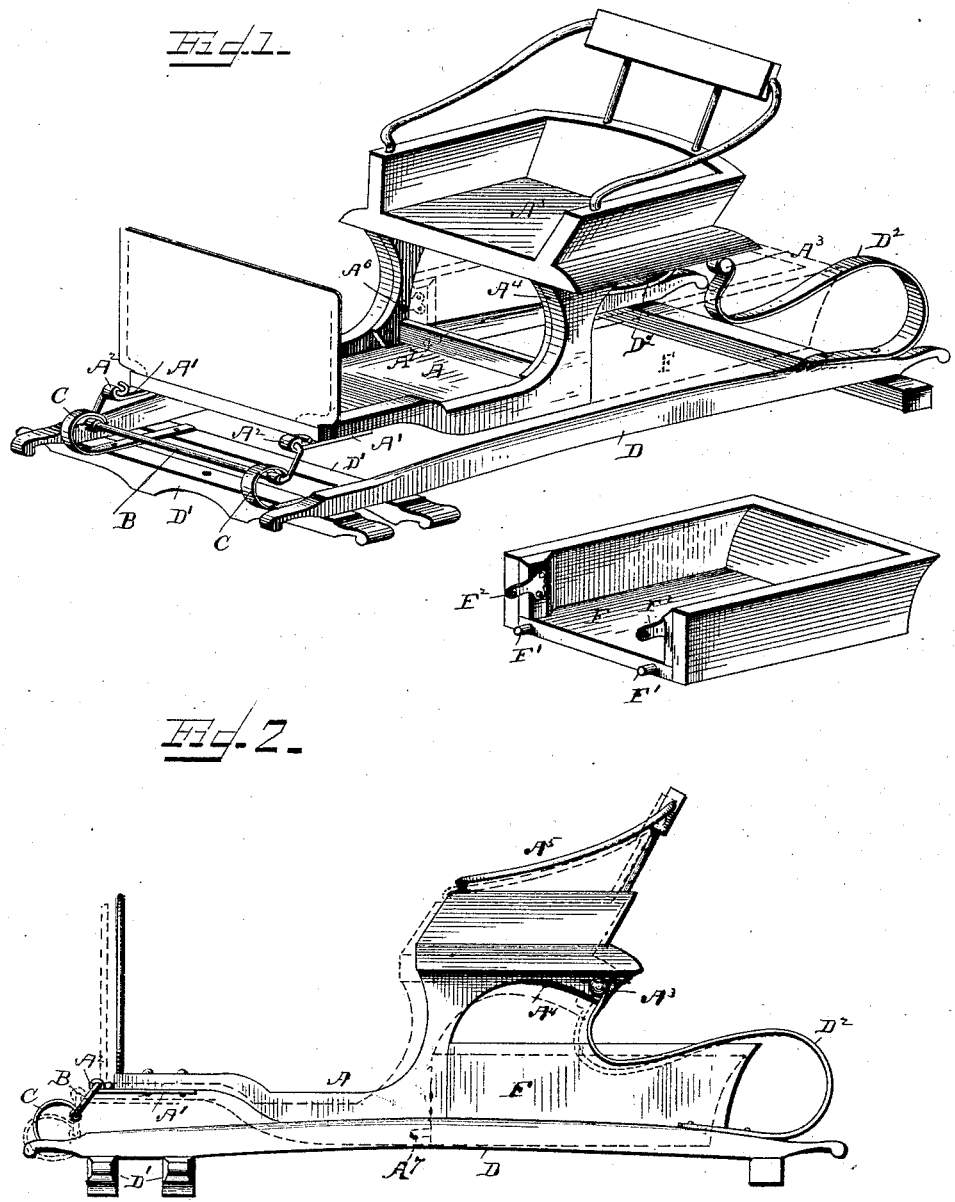

DAVID SPENCER ANDERSON, OF McGRAWVILLE, NEW YORK.

VEHICLE.

SPECIFICATION forming part of Letters Patent No. 327,429, dated September 29, 1885.

Application filed June 22, 1885. (No model.)

*To all whom it may concern:*

Be it known that I, D. S. ANDERSON, a citizen of the United States, and a resident of McGrawville, in the county of Cortland and State of New York, have invented certain new and useful Improvements in Vehicles; and I do hereby declare that the following is a full, clear, and exact description of the invention, which will enable others skilled in the art to which it appertains to make and use the same, reference being had to the accompanying drawings, which form a part of this specification.

My invention has for its object the production of a light road-wagon in which, through the peculiar construction and arrangement of the supporting-springs, all of those violent jars caused by the sudden stoppage or starting of the vehicle are avoided.

To this end my invention consists in the improved construction and combination of parts, which will be hereinafter fully described, and pointed out in the claims.

Referring to the annexed drawings, Figure 1 is a perspective view of my improved vehicle, showing the body of the same disconnected from its normal position; and Fig. 2 is a side view of the vehicle.

The same letters of reference indicate corresponding parts in both figures.

Referring to the several parts by letter, A represents the frame which supports the seat of the vehicle in its proper position, the forward end of this frame being provided with the metal straps A', the free ends of which are curved to form pivotal bearings for the upper ends of the connecting link or frame B, to the lower portion of which the upper ends of the forward springs of the vehicle are connected. This link or frame B is formed of a single metallic rod bent in the form shown, its ends, after passing through the eyes $A^2$ of the metal straps A', being curved or bent again parallel to that portion which passes through the said eyes, so as to extend normally immediately above the upper side of the straps A' between the eyes of the same and the dashboard of the vehicle.

C C indicate the forward springs of the vehicle, each of which is rigidly secured at its lower end to the forward cross-bars, D', of the rectangular frame D, the central portion of the spring being curved into a circular form, and its upper extremity secured to the lower longitudinal side or part of the frame B, as shown.

$D^2$ $D^2$ indicate the large rear S-shaped springs, which support the principal weight of the vehicle-body and the occupant of the same, the lower end of each spring being rigidly secured upon the side bar of the rectangular frame D near the rear end of the same, while its upper forward end is pivotally secured around a bolt or pivot, $A^3$, secured in the seat-frame $A^4$ beneath the rear portion of the seat, as shown. The forward upper ends of the S-shaped springs which are connected to the seat-frame are only curved backward very slightly over the main portion of the springs, the object of this arrangement being that when the driver is sitting in the seat $A^5$ the weight of his body will operate, through this arrangement of the rear springs, $D^2$ $D^2$, to swing the body of the vehicle forward as well as downward.

It will be seen that when the vehicle is depressed beneath the weight of the driver's body the lower portion of the frame B will at first swing upward until its free extremities come in contact with the upper side of the straps A', when the frame will be held with its lower portion projecting forward at an angle of about forty-five degrees, as shown, so that the downward weight of the driver's body will bear upon the front curved springs, C C, at about that angle, this arrangement, in conjunction with the peculiar construction and arrangement of the rear springs, $D^2$ $D^2$, before described, serving to swing the body of the vehicle forward as well as downward, as shown in dotted lines in Fig. 2 of the drawings, while on the recoil movement the body of the vehicle will be swung in an exactly reverse direction—that is, upward and also rearwardly.

F represents the detachable body proper of my improved vehicle, which consists of the usual box, in this case left open at its forward end and provided thereat with the forwardly-projecting studs or pins F' and spring-catches $F^2$, adapted to engage with the transverse studs or pins $A^6$ in the frame A of the vehicle, the forwardly-projecting pins F' entering suitable apertures, $A^7$, in the said frame, so that by this arrangement the detachable body may be removed from the vehicle by disengaging the spring-catches F² from the pins A⁶, thereby converting the vehicle into a skeleton road-wagon and materially decreasing its weight.

From the foregoing description, taken in connection with the accompanying drawings, the construction of my improved vehicle will be readily understood without requiring further explanation. It will be seen that if the horse starts suddenly, instead of throwing the head and shoulders backward, the seat moves backward and upward, thus inclining the head forward and entirely avoiding the disagreeable jerk and shock which is commonly felt under these circumstances; while, in case of the horse stopping suddenly, or the wheel or wheels of the vehicle striking against an obstruction in the road, this motion is reversed with the same agreeable results.

It is obvious that my improved springs may be as readily applied to a heavy two or three seated wagon, in which case the forward ends of the rear springs are attached to the front of the rear seat and the curve of the same brought directly over the axle.

Having thus described my invention, what I claim, and desire to secure by Letters Patent of the United States, is—

1. As an improvement in vehicles, the combination, with the vehicle-body, of the rear S-shaped springs, arranged as described, the front curved springs and the connecting link or frame, all constructed and arranged to operate in the manner and for the purpose shown and set forth.

2. As an improvement in vehicles, the combination, with the vehicle-body having the transverse studs or pins and the apertures, arranged as described, of the detachable box having the forwardly-projecting pins and the spring-catches, arranged as described, for the purpose set forth.

In testimony that I claim the foregoing as my own I have hereunto affixed my signature in presence of two witnesses.

DAVID SPENCER ANDERSON.

Witnesses:
CLAYTON PHILLIPS,
C. D. FISH.